Sept. 9, 1969  JEAN-CLAUDE LAGIER  3,466,521

CONTROL SYSTEM FOR UNIVERSAL MOTORS

Filed Jan. 26, 1967

INVENTOR

JEAN-CLAUDE LAGIER

BY Emary G. Groff Jr.
ATTORNEY

United States Patent Office 3,466,521
Patented Sept. 9, 1969

3,466,521
CONTROL SYSTEM FOR UNIVERSAL MOTORS
Jean-Claude Lagier, Onex-Geneva, Switzerland, assignor to Mefina S.A., Fribourg, Switzerland, a corporation of Switzerland
Filed Jan. 26, 1967, Ser. No. 611,983
Claims priority, application Switzerland, Feb. 10, 1966, 1,922/66
Int. Cl. H02p 1/24, 3/18, 5/28
U.S. Cl. 318—245                           6 Claims

ABSTRACT OF THE DISCLOSURE

A control system for alternating current universal motors, forming an econimical and simple circuit dissipating very little heat and wherein the control electrode, which ignites or fires at an adjustable moment, the controlled diode which controls the feed of alternating current to the motor is connected with a charging point connecting the condenser with a variable resistor in the circuit controlling the controlled diode; furthermore, an auxiliary resistor and diode circuit provides time constants which are different for the two alternations of the period of the feed current.

---

Control systems have already been proposed in the art for electric universal motors fed with alternating current through at least one controlled diode, the ignition moment of which is controlled by a control circuit including at least one condenser inserted in series with a variable resistor.

The provision of such systems requires the solution of numerous problems, the chief one being that of dissipating or reducing the heat arising in the case where the control system is to be enclosed within a restricted volume without any ventilation being possible. The solutions proposed hitherto are comparatively intricate and expensive, or else they require connections inside the motor, chiefly between the rotor and the energizing winding.

The object of the present invention is to provide a control system having a simple and inexpensive solution of the problem, wherein the power dissipated is very small. Furthermore, said novel solution leads easily to the provision of a control system forming an auxiliary adapted to be incorporated with extant arrangements.

The invention has for its object providing a control system or motor speed adjustment control system of the type referred to and its novelty resides in circuitry whereby the ignition or control electrode of the controlled diode is connected with the point connecting the variable resistor with the condenser, while at least one diode and one auxiliary resistor are connected in a manner such as to provide different time constants during the two alternations of the period of the alternating voltage feeding the motor.

Figure 1:
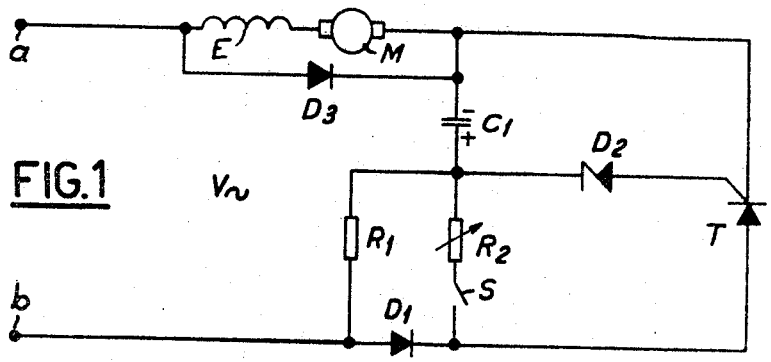
Figure 2:
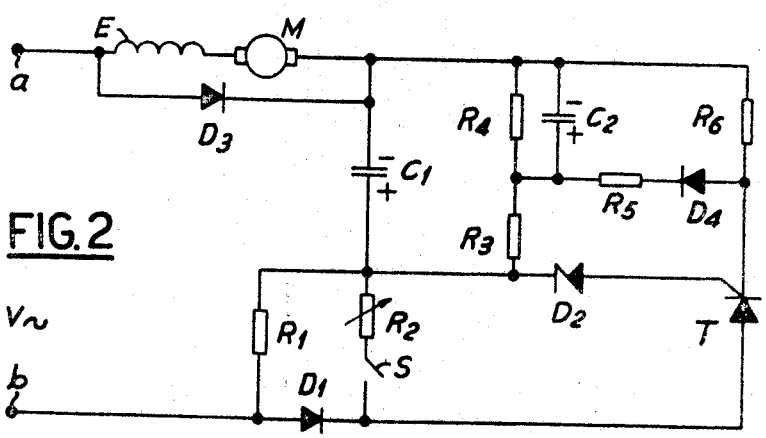
Figure 3:
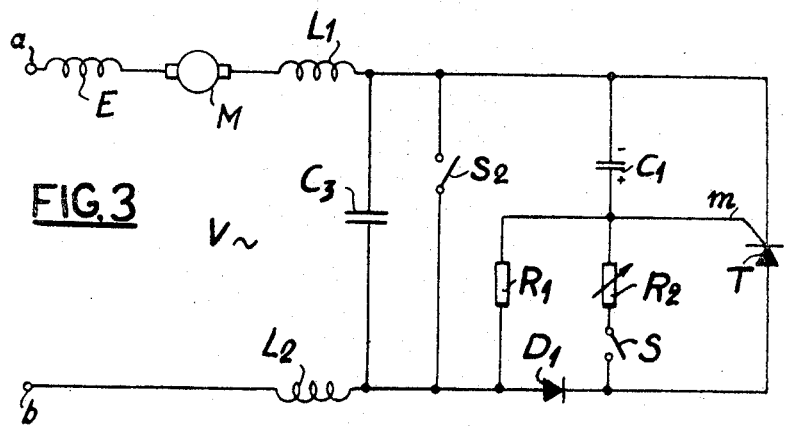

The accompanying drawing illustrates diagrammatically and by way of example three embodiments of the control system forming the object of the invention. In said drawing:

FIGS. 1 to 3 illustrate respectively the schematic electric wiring diagrams corresponding to said three embodiments.

Turning first to FIG. 1, the motor M provided with a commutator and of which the energizing winding E is inserted in series is fed by a supply of alternating current connected across the terminals $a$ and $b$. The current feeding the motor is controlled by a thyristor or controlled diode T, the control electrode of which is connected through a Zener diode $D_2$ with one terminal of a condenser $C_1$ of which the other terminal is connected with one of the terminals of the motor. The terminal $b$ of the supply of alternating current is connected with the condenser $C_1$ through a resistor $R_1$ and through a variable resistor $R_2$, connected in parallel therewith, which is connected with the cathode end of a diode $D_1$ of which the anode is connected with said terminal $b$. A switch S allows disconnecting the resistor $R_2$ from the circuit.

In order to prevent any overvoltage appearing across the terminals of the motor M during the reversal of the voltage from delaying the ignition of the thyristor T, the motor M is shunted by a diode $D_3$. Thus, the current passing through the motor at the moment of the reversal of the voltage can continue flowing through said diode $D_3$.

When the terminal $b$ is positive with reference to the terminal $a$, the condenser $C_1$ is charged through the resistors $R_1$ and $R_2$ inserted in parallel since the diode $D_1$ is then conductive.

As soon as the voltage across the condenser $C_1$ has reached the voltage of the Zener effect in the diode $D_2$, the latter becomes conductive and the currents passing through the resistors $R_1$ and $R_2$ feed the electrode conrtolling the thyristor T which now becomes conductive.

Obviously, the condenser $C_1$ reaches more or less speedily the voltage corresponding to the Zener effect in the diode $D_2$, according to the value selected for the variable resistor $R_2$. The control of said resistor consequently allows adjusting the ignition angle of the thyristor T with reference to the alternations during which the terminal $b$ is positive with reference to the terminal $a$, and thus adjusts the speed of the motor. As soon as the following alternation appears, the terminal $a$ becomes positive with reference to the terminal $b$ and the diode $D_1$ and also the thyristor T enter their nonconductive condition; it should be remarked that the diode $D_1$ is inserted in series with the thyristor T so that it protects the latter against any possible overvoltage.

As a consequence of the reversal in polarity, the current flows through the condenser $C_1$ in a reversed direction so the condenser $C_1$ discharges through resistor $R_1$. Due to the nonconductive state of diode $D_1$ the condenser is now connected with the terminal $b$ only through the resistor $R_1$ of which the value is selected so as to be large enough to maintain the discharge current of the condenser at a level which is too low for a disturbing reversal of the polarity across the terminals of the condenser $C_1$ to occur during the negative alternation and to allow current to thus feed through the diode $D_2$ and the electrode controlling the thyristor T. This circuit thus provides very different time constants for the charging and discharging of condenser $C_1$.

The circuit illustrated in FIG. 1 is very simple and allows an easy adjustment of the speed of the motor M through a change in the ignition angle or phase-shifting of the ignition of the control electrode of the thyristor T. However, the arrangement which allows adjusting the average voltage across the terminals of the motor M does not respond to the changes in load to which the motor may be subjected. In practice, numerous cases exist wherein the load of the motor may vary within a large range. This is particularly the case in sewing machines wherein the load of the motor differs considerably according to whether the work in the machine is constituted by a thin and light fabric, or else by a plurality of thick and closemeshed fabric layers. It is therefore of interest to provide an adjustment in speed which is not substantially influenced by the load to which the motor is subjected.

FIG. 2 is a wiring diagram of a modified circuit of the invention which solves the problem, which diagram corresponds exactly to that of FIG. 1 as far as its main components are concerned, with the addition however to said wiring diagram of resistors $R_3$ to $R_6$, of a diode $D_4$ and of a condenser $C_2$.

Each time the thyristor T is conductive, a current pulse passes through the motor M, the amplitude of said pulse depending for a predetermined value of $R_2$ on the load of the motor M. Each pulse produces a drop in voltage across the terminals of the resistor $R_6$ and the voltage pulses collected are rectified by the diode $D_4$ and charge the condenser $C_2$ through the resistor $R_5$. The condenser $C_2$ is shunted by the resistor $R_4$ across the terminals of which there appears an average voltage which is proportional to the load of the motor M. Said average voltage is applied to the condenser $C_1$ through the resistor $R_3$.

If the load on the motor increases, the voltage across the terminals of the condenser $C_2$ increases and this reduces the discharge of the condenser $C_1$. Thus, when the terminal $b$ becomes positive, the condenser $C_1$ retains a higher voltage charge and the duration of charging of said condenser through the resistors $R_1$ and $R_2$ before it reaches the Zener potential of the diode $D_2$ is shortened and it is all the shorter when the voltage across the terminals of the condenser $C_2$ is higher. Thus, any increase in the current absorbed by the motor automatically produces a lead or a forward shifting of the point of ignition of the control electrode of thyristor T for each alternation. In contradistinction, when the motor M is idle, the condenser $C_2$ receives only a very low voltage through the resistor $R_6$ and the ignition point of the thyristor T is delayed, which lowers the average voltage applied to the motor M. The wiring diagram according to FIG. 2 thus allows obtaining through a suitable selection of the resistors $R_3$ and $R_4$ and also of the capacity of the condenser $C_2$ an excellent adjustment of the motor speed, which adjustment remains to a large extent independent of the differences in the load to which the motor M is subjected.

FIG. 3 shows another modified circuit arrangement of the invention of a type similar to that illustrated in FIG. 1 but it further includes two induction coils $L_1$ and $L_2$ and a condenser $C_3$ forming together a low pass filter adapted to arrest the high frequency components produced by the ignitions and extinctions of the thyristor T. Furthermore, a switch $S_2$ has been provided for bridging the thyristor T, which allows feeding the motor M under full power conditions, when required. To this end, the closing of the switch $S_2$ provides the direct feeding of the motor M through both complete alternations of the alternating current of the A.C. supply. Lastly, the thyristor T is of a type for which the current voltage feeding the control electrode is small, of a magnitude of 0.2 m.a. For this reason the Zener diode $D_2$ has been cut out in the diagram of FIG. 3 and the electrode $m$ igniting said thyristor is connected directly with a terminal of the condenser $C_1$.

It is possible of course to imagine numerous other embodiments of the invention and in particular it is by no means necessary for the resistors $R_1$ and $R_2$ and also for the diode $D_1$ to be connected in the manner illustrated in FIGS. 1 to 3. As a matter of fact, the resistor $R_1$ may for instance be inserted in series with the resistor $R_2$ between the terminal $b$ and condenser $C_1$, said resistor $R_1$ being then bridged by the diode $D_1$ so as to be short-circuited by the latter when the terminal $b$ is positive with reference to the terminal $a$. Thus, the duration of charging of the condenser $C_1$ is controlled by the resistor $R_2$ alone, whereas its duration of discharge depends on the two resistors $R_1 + R_2$ inserted in series. However, the solution illustrated in the drawings is more advantageous since the diode $D_1$ is inserted in series with the thyristor T and forms thus a diode protecting the latter against voltages in the opposite directions.

I claim:

1. A speed adjusting control system for an electric universal motor fed by source of alternating current, comprising a controlled diode having a pair of output electrodes connected in series circuit with the motor across said source of alternating current, said controlled diode having an input electrode controlling the conductive condition of said controlled diode, a control circuit including a condenser and a variable resistor connected in series across the said pair of output electrodes of said controlled diode, a junction connecting said condenser and said variable resistor, said junction connected with said input electrode controlling said diode, and an auxiliary circuit including a further resistor and a rectifier connected with said control circuit and said series circuit on the opposite side of said controlled diode from said motor, said further resistor having one terminal connected to one end of said variable resistor and another terminal connected to said series circuit, said rectifier having at least one terminal connected in said series circuit, and said rectifier connected relative to said resistors to connect one of said resistors in the control circuit during an alternation of one polarity of the source and both of said resistors in the control circuit during an alternation of the opposite polarity of the source to produce different time constants for the two alternations of the period of the alternating current feeding the motor.

2. A control system as claimed in claim 1 wherein said rectifier is connected in series with the controlled diode in a direction protecting the latter against overvoltages in a reversed direction.

3. A control system as claimed in claim 1, wherein the motor, the condenser, the variable resistor and said rectifier are connected in series and said further resistor connected shuntwise across the variable resistor and said rectifier.

4. A control system as set forth in claim 1 including a third resistor connected in the series circuit between the motor and said controlled diode, a further circuit including a diode and a second condenser connected in series across said third resistor, said diode connected to the series circuit at a point between said third resistor and said controlled diode, and a voltage divider circuit having a first portion connected across said second condenser and a second portion connecting said further circuit to said junction to apply to said condenser in said control circuit a voltage which is a function of the load to which the motor is subjected to correspondingly adjust the charge on said control circuit condenser.

5. A control system as set forth in claim 1 including a third resistor connected in the series circuit of the motor and controlled diode between the motor and one of said output electrodes of said pair of output electrodes to produce a voltage drop thereacross during the periods of conductivity of said controlled diode, a further circuit including rectifying means connected across said third resistor to produce a direct current proportional to the drop in voltage across said third resistor during the periods of conductivity of the controlled diode, and means connected in said further circuit with said rectifying means connecting said further circuit to said junction to vary the charge on said condenser in said control circuit in accordance with the voltage drop across said third resistor and consequently with the load to which the motor is subjected.

6. A control system as claimed in claim 1, including a break-down diode having a Zener characteristic connecting said input electrode with said junction which connects condenser with the variable resistor in the control circuit.

References Cited

UNITED STATES PATENTS

| 3,165,688 | 1/1965 | Gutzwiller | 318—345 |
| 3,283,235 | 11/1966 | Auld et al. | 318—345 |
| 3,316,472 | 4/1967 | Taylor | 318—345 |

ORIS L. RADER, Primary Examiner

K. L. CROSSON, Assistant Examiner

U.S. Cl. X.R.

318—249, 341, 507